United States Patent [19] [11] 4,434,026
Harris [45] Feb. 28, 1984

[54] ACID CONCENTRATING AND RECOVERY SYSTEM

[76] Inventor: Mack Harris, 4608 W. 25th St., Little Rock, Ark. 72204

[21] Appl. No.: 347,678

[22] Filed: Feb. 10, 1982

[51] Int. Cl.³ .................... B01D 1/00; B01D 1/02; B01D 1/30
[52] U.S. Cl. .................... 159/1 S; 159/28 C; 159/44; 159/DIG. 19
[58] Field of Search .................... 159/1 S, 28 R, 28 C, 159/29, 44, DIG. 19

[56] References Cited

U.S. PATENT DOCUMENTS

| | | | |
|---|---|---|---|
| 2,241,209 | 5/1941 | Lea | 159/28 R |
| 3,333,019 | 7/1967 | Nathan et al. | 159/DIG. 19 |
| 3,351,538 | 11/1967 | Andrassy | 159/1 S |
| 3,420,745 | 1/1969 | Schlueter | 159/1 S |
| 3,743,484 | 7/1973 | Morimoto | 159/DIG. 19 |
| 3,929,122 | 12/1975 | Alkasab | 159/1 S |
| 3,969,214 | 7/1976 | Harris | 204/275 |
| 3,970,511 | 7/1976 | Rat et al. | 159/DIG. 19 |
| 4,014,735 | 3/1977 | Guth et al. | 159/DIG. 19 |
| 4,338,922 | 7/1982 | Moore | 159/1 S |

Primary Examiner—Bradley Garris
Attorney, Agent, or Firm—James A. Wong

[57] ABSTRACT

System for concentrating and recovering acid comprising in combination a receptacle or storage tank for receiving and containing weak or dilute acid; an evaporating pan including a pipe connected to the receptacle or storage tank and a pump whereby acid may be delivered to the evaporating pan; a second receptacle or storage tank including a pipe connected to the evaporating pan and a pump whereby concentrated acid may be delivered to the second receptacle or storage tank; and an air drier device in the form of a tank containing acid and including an inlet through which air and water vapor may be introduced, and a pipe connection to the tank for weak or dilute acid; wherein the evaporating pan includes a heat collecting surface as a floor thereof and a lens focus top whereby heat energy from the sun's rays will heat and concentrate the acid therein by developing water vapor which is removed with air.

7 Claims, 7 Drawing Figures

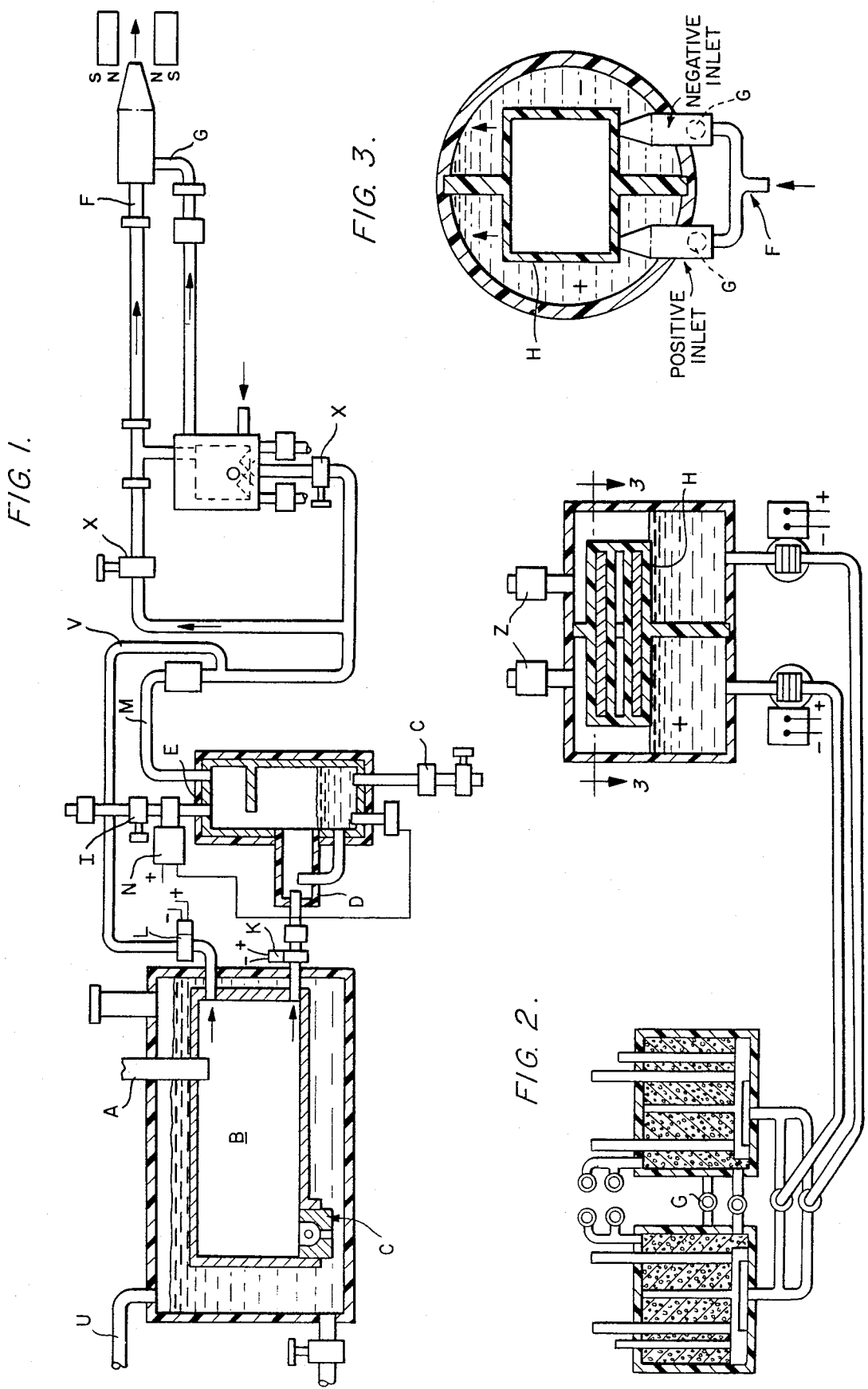

ACID CONCENTRATING AND RECOVERY SYSTEM

FIELD OF THE INVENTION

The disclosed invention relates to a system comprising a component, such as a battery, using acid and an apparatus for concentrating and recovering acid for storage and/or further use.

SUMMARY OF THE INVENTION

It is an object of the disclosed invention to provide a new and improved apparatus for concentrating and recovering acid for storage or for use, as may be desired, in devices such as batteries, which have need for acid.

Another object of the disclosed invention is to provide a new and improved apparatus for converting and storing naturally available energy from the sun or wind for use at night or during periods of tranquillity.

It is also an object of the disclosed invention to provide a new and improved apparatus for storing solar energy during summer seasons for use during winter seasons.

It is further an object of the disclosed invention to provide a new and improved portable apparatus by which heat energy in the air may be used to reconcentrate an acid and to generate electricity.

It is, moreover, an object of the disclosed invention to provide a new and improved apparatus including an air drier device in which air heated by the sun or by exhaust heat may be used to concentrate acid by evaporating and removing water therefrom.

SUMMARY OF THE DRAWINGS

Illustrative of the disclosed invention the appended drawings represent in:

FIG. 1, an elevational, partially cross-sectional side view of an air storage tank in a water case with air drier (E) connected to ion separating devices;

FIG. 2, an elevational, cross-sectional view of an ion tank, with ions separated therein, the tank being connected by outlet pipes and pumps to electric and gas generating cells;

FIG. 3, a cross-sectional, top view of the ion tank taken on the line 3—3 of the FIG. 2;

DESCRIPTION OF THE PREFERRED EMBODIMENT

Figure 4:
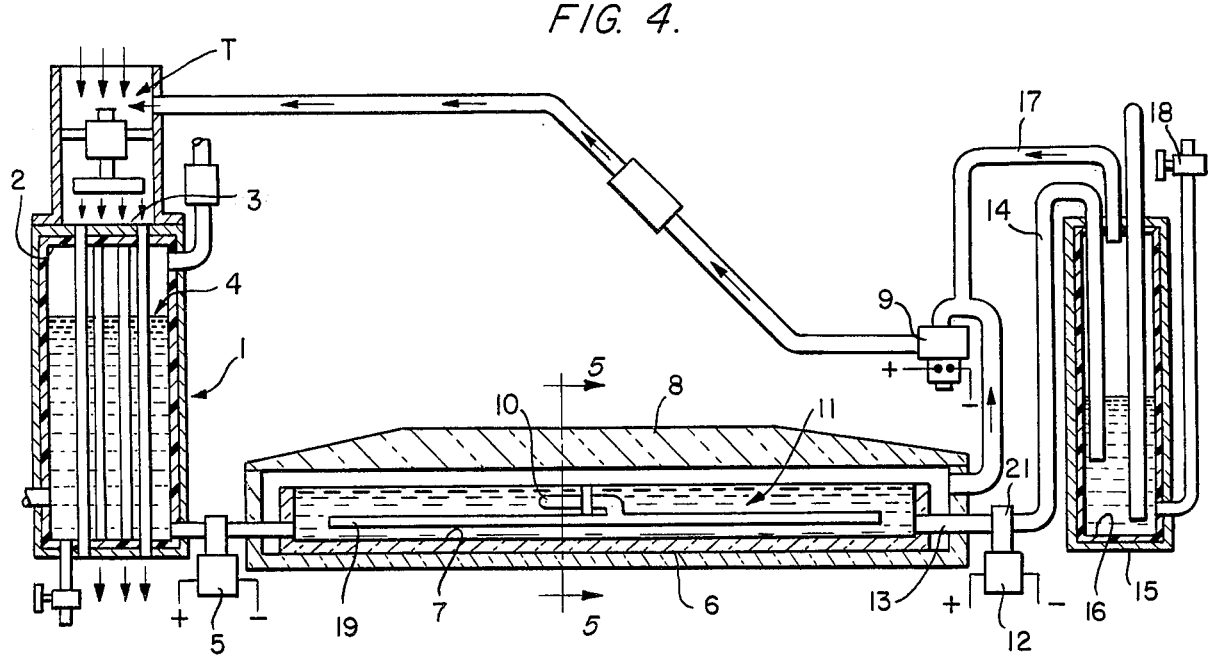
FIG. 4, an elevational, cross-sectional view of an acid reconcentrating device.
Figure 5:
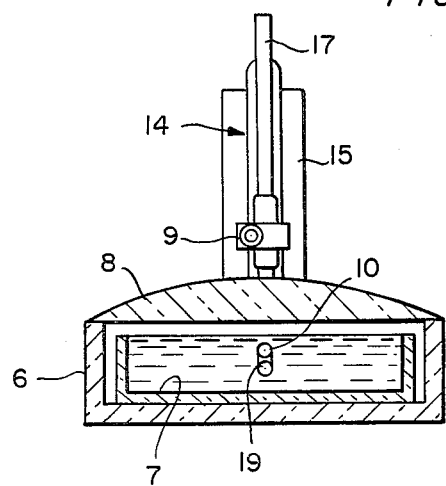
FIG. 5, an elevational, cross-sectional end view taken on the line 5—5 of FIG. 4.
Figure 6:
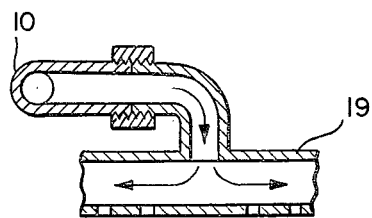
FIG. 6, a fragmentary cross-sectional view of exhaust pipe and a heat exchange tube section of the disclosed invention connected together.

Referring now to the drawings in detail and in particular to FIG. 4, the reader will see that the disclosed invention comprises a weak or diluted acid storage tank 1, an evaporating pan 6, and a storage tank 15 for relatively stronger acid operatively associated and/or connected with each other as disclosed herein. A diluted acid solution 4, such as $H_2SO_4$ of a concentration of about 85% may be introduced into tank 1, which is provided with a plastic lining 2, or otherwise pumped into tank 1 from an air drier device E, shown in FIG. 1, when such acid becomes too diluted or weak for generating heat or electricity. Air drier E and tank 1 are connected to each other by piping provided with an electrically operated valve N and a pump R, which is operated to pump acid from air drier E when the concentration of such acid drops to about 85%, to tank 1 through a cap. An initial concentration stage may be effected in tank 1 by passage of atmospheric air drawn by a blower T through metal tubes passing through tank 1 in heat exchange relationship with acid 4 to warm up acid 4. The metal tubes passing through tank 1 may be packed with fins to enhance its heat exchange function. The dilute acid 4 is pumped by pump 5 into evaporating pan 6 through an interconnecting pipe section for further concentration. Operation of pump 5 is controlled by a float switch 20, shown in FIG. 7, when acid introduced into pan 6 reaches a predetermined level. Evaporating pan 6 is provided with a black lining 7 of Teflon or like material on the bottom and/or side. Reconcentration of the acid brought into pan 6 is achieved by evaporating the water content in the acid by solar energy developed by the sun's rays being concentrated and focused by lens focus top 8 onto black Teflon lining 7. As may be seen in FIG. 4, lens focus top 8 is disposed over pan 6. As lining 7 is heated from the sun's rays, the air and water vapor which is developed are removed from pan 6 by a suction or vacuum fan 9 leaving a concentrated acid 11 in pan 6. When the acid 11 in pan 6 reaches a concentration of about 92%, a pump 12 for discharging the acid 11 is turned on by a gravity control switch 21 to draw acid 11 through a suction pipe 13 and through a discharge pipe 14 and into a storage tank 15. To augment the concentration of acid in pan 6, hot exhaust air from ion tank, shown in FIGS. 2 and 3, may be brought into pan 6 through pipe 10 connected to a tube 19 having small outlet holes in the bottom through which hot dry air passes into contact with the acid solution and accelerates evaporation of the water content. When the concentration of the acid reaches a level of about 92%, pump 12 is turned on by gravity control switch and the acid 11 is pumped to concentrated acid storage tank 15. On the other hand, when the concentration of the acid 11 in pan 6 is diluted to about 90% by addition of weakened acid from tank 1, for example, pump 12 is kept in the off condition by switch 21, since acid of a concentration of about 90% is too weak for use, as desired, and for storage in tank 15. A plastic lining 16 is also provided in tank 15. Air which is pumped into storage tank 15 along with acid is vented through a vent pipe 17, which is connected to vacuum fan 9, as the acid mixture rises. Acid may also be introduced into storage tank 15 through an additional pipe having a control valve 18 when such control valve 18 is open.

A vacuum pump S with a suction pipe connected to the top of evaporating tank 1 operates to reduce vapor pressure and thereby accelerate evaporation of water content of the acid mixture. As the reconcentrated acid is pulled from the tank 15 by a pump R which forces the acid through outlet pipe connected to the air drier E, the air compressor pulls water vapor from the discharge pipe of vacuum pump S and also pulls water vapor from water case around air storage tank B. The compressor additionally forces the air mixed with water vapor out through the pipe A connected to air tank B. The outlet pipe of tank B is connected to the air drier E so that the air, water and acid mix in the air drier E. When the mixture gets hotter, the hot air and some water vapor are exhausted through the pipe M that is connected to the $H_2$—$O_2$ burner and the negative and positive inlets which are connected in the ion tank. The air escapes from ion tank through outlets Z connected to pipe 10. The pipe 10 is connected to tube 19 located in the evaporating pan 6 and described above as having small outlet holes on the bottom side so that the exhaust air can pass out into the mixture of acid and help hasten water evaporation, as been seen in FIGS. 1, 2, 4, 5, and 6. Some of the water vapor that is pumped into an air tank B will condense and be returned as liquid water to the water case through float valve C. The air and water vapor could be controlled by the valves X on the exhaust pipe M which is connected to an $H_2$—$O_2$ burner and to an exhaust tee with the pressure being maintained at about 300 psi in the air drier E. Hot air and some water vapor will pass out through the top; the hot acid mixture will pass out from the bottom or from a lower place near the bottom; and the acid mixture is piped so it will return to the evaporating tank 1. $H_2$—$O_2$ is generated in the cells illustrated in FIG. 2. This $H_2$—$O_2$ is passed from manifold pipes connected between the cells and a burner, in which burner the $H_2$—$O_2$ is electrically ignited with resultant heat and vapor being passed out through an exhaust tee connected by a pipe to tee F that is connected to the negative and positive inlets. Pumps connected to bottom outlet pipes on the ion tank operate to force the separated ion mixture into the cells to charge them and to wash the produced gases loose from the granulated carbon electrodes. The gases are then passed out through manifold piping connected to the $H_2$—$O_2$ burner, the manifold piping prevents the cells gases and ions from mixing. The cells are provided with ions outlet manifold piping connected to the side of the cell case. The negative cell outlet manifold piping is connected by pipe to a jacket around the $H_2$—$O_2$ burner. The ionized mixture from the negative cells pass between the $H_2$—$O_2$ burner wall and jacket. The ions pass out through a hot ions outlet pipe that is connected to negative inlet nipple G. The positive cells outlet manifold piping is connected to positive inlet nipple G. The heat energy and pressure propel the ionized mixture across magnetic flux and the ions separate to opposite sides of the magnet housing separator H that is connected in an ion tank, best shown in FIGS. 1, 2, and 3. High vacuum pump S with suction side connected to evaporating tank 1 is shut off when the acid is reconcentrated. Heat is removed from air forced by blower T through tubes in evaporating tank 1. A bypass pipe V is provided so water vapor mixed with the air will bypass the air drier E by changing the flow with valves K and L. If the mixture in tank 1 becomes too diluted, the valve K is closed and valve L is opened. A valve N and pump R are controlled by a temperature switch connected to air drier E. Another valve C is connected on the outlet pipe connected to the bottom of the air drier E so the liquid mixture may be passed and the air and water vapor are trapped. When the acid reconcentrating device is installed in a portable power turbine vehicle, the acid pump R, having a capacity of four pounds per minute with a head pressure of four hundred psi, is operable to pull acid from the bottom of the storage tank 15. To start turbine operation, first open valve X, close the electric switches on a panel in steps 1, 2, and 3. In step 1, close switch that draws electric power from a battery so that the current will power the air compressor.

Open valve K, power pump R and pump P, adjust valve X so pressure on gauge is maintained at 390 psi. In step 2, close another switch to power blower T, open valve H, to gravity control switches 21 to let the current flow to power high vacuum pump S and to open valve O which is connected on the activated carbon filter float valve C outlet pipe, and close valve L. When acid is too diluted in tank 1, the valve O will close and valve L will open the current that flow through float control switch 20, power pump 12 to maintain level in tank 1. The turbine should power a 22,000 watt AC generator and/or could be used to operate the apparatus on 4 hp for the air compressor, $4\frac{1}{2}$ hp for vacuum pump S, 113 hp for blower T, $\frac{1}{8}$ hp for pump R, $\frac{1}{8}$ hp for pump P, $\frac{1}{8}$ hp for pump 12, and less than $\frac{1}{2}$ hp for the valves. In step 3, close the switch for powering a vehicle so that the electric current will flow through a rectifier to change AC to DC and through a rheostat to the 18 hp DC motor. The turbine may be coated on the inside with an acid resistance material. Some of the acid vapor will be mixed with water, exhausted from the turbine through the exhaust pipe 10 connected to blower case T. The acid and water vapor will be condensed in the evaporating tank 1 and air passage tubes. The blower air current will force the condensed acid and water into an activated carbon filter that has a float valve C connected to an outlet pipe so the condensed liquid will cause the float to open and the valve outlet pipe connected to a suction pipe U which in turn is connected at one end to the top of the water case and connected at the other end to the air compressor suction pipe. In this way, some of the mixture is returned through pump, air drier E which has a float valve C connected on its outlet pipe and the outlet pipe of float valve C is connected to the bottom of evaporating tank 1. A chunk limestone filter is connected to the outlet end of activated carbon filter so that any acid vapor exhaust would be neutralized. The valve W restricts pump P outlet pipe to only pass 250 grams per minute. The high vacuum pump S removes about 300 grams of vapor per minute. When the acid in evaporating tank 1 gets colder and the air forced through tubes in tank 1 gets colder, the gravity control switch 21 will break the circuit to vacuum pump S. The acid storage tank 15 and the evaporating tank 1 are relatively small when used to power a vehicle. When used to store energy in summer for usage in winter, the tanks could be very large.

Figure 7:
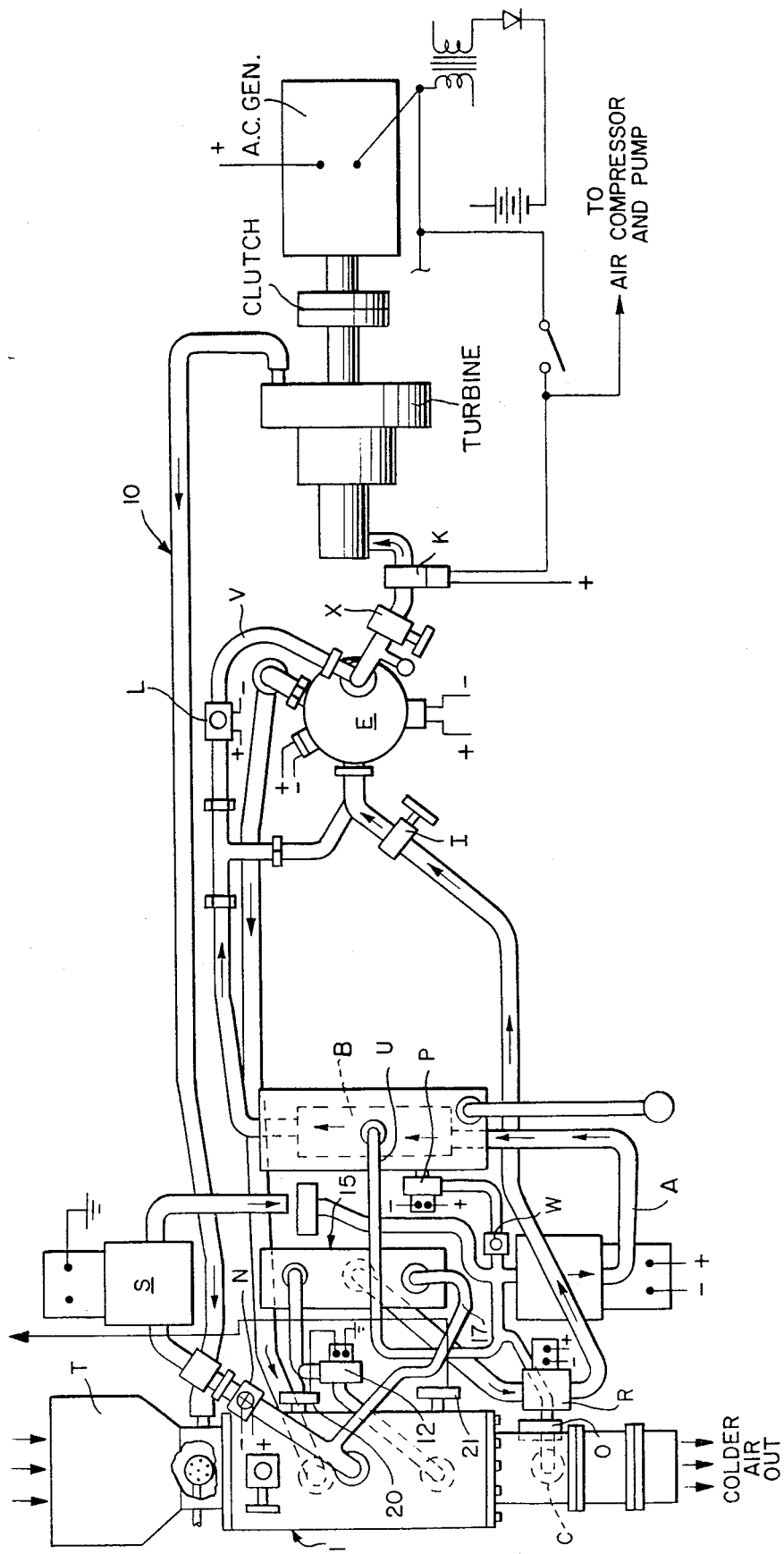
FIG. 7, a top view of an acid reconcentrating device connected to the air drier for driving a turbine.

An $H_2SO_4$ acid could be used for liberating heat as shown in my U.S. Pat. No. 3,969,214, with the valve I being adjusted so that about 900 grams of acid is pumped by pump R and be passed per minute. Heat and high pressure pipes may be heat insulated. The valve O is connected on float valve C outlet pipe which has one end connected to suction pipe U. The blower T should pull 3,000 cfm. When the air that is pulled in by blower T is below 0° C., the blower may be shut off and the gas burner shown in the cutaway neck of blower T case is turned on and the gas is lit by an electric igniter. The intake end of the blower T may be closed off and the case heat insulated as shown in FIG. 7.

It should be understood that a mixing chamber or the air drier could be connected so that the exhausting hot air and vapor can be passed by pipe through a manifold piping having electric valves connected between the manifold outlet nipples and nipples connected in the spark plug ports of a four stroke engine. Electric valves could be controlled by a timer which would open the electric valves at the beginning of the power stroke and the timer could let a current pass to electric valves so that valves could stay open for about one fifth of the power stroke, the pressure from the air drier or mixing chamber would push the engine pistons. The engine shaft could be connected by pulleys and belts to a generator, an air compressor, and an electric motor that draw electric power from a battery to start the devices rotating. The engine would have the carburetor replaced by pipe that would be connected to the evaporator tank so a partial vacuum hastens evaporation. If an engine of this type is used, it would act as a vacuum pump and help drive the generator and air compressor. It also should be understood that the four stroke engine would operate at slower speeds than the tubine, but use less air and vapor by volume. Advantages of the disclosed invention would be the use of a smaller air compressor and no vacuum pump with the atmosphere air being forced through a heat exchanger to exchange more heat than a convection flow. My heat exchange tubes for a portable device have an area of about 650 sq. ins. and at a 15° C. difference in temperature when connected to operate a four stroke engine having at least two cylinders which can collect over 250 grams of vapor per minute and cause the generator to produce over 18,000 watts per second. With a thermoelectric device using a thermopile conversion system, it would take a heat exchange area of about 172,800 sq. in. at 15° difference in temperature to generate same watts per second.

The pumps shown to be below the elevated ion tank and connected thereto in FIG. 2 are of single stroke and direct drive in operation to provide a gain of momentum on the suction stroke by a pressure of forty psi maintained as air passes from the ion tank and escapes through a pressure valve connected to the pipe 10. The pumping part of these pumps which are connected to the ion tank are electrically insulated from the motor and any contact therewith. An air compressor motor and electric power devices are connected to initially draw electric power from an outside source and then to store a difference of potential in the cells. After the cells are charged to about 322 volts the electrical devices are disconnected from the outside source and are connected to draw power from the cells. Heat energy and elastic energy are provided in the system to separate the ions for storage in an ion tank. Exhaust heat energy, for example, is utilized in evaporation of water from an acid in the recovery station. The high vacuum pump S is shut off when vapor pressure is reduced to about one mm and is turned on at about ten mm so that heat in the air that is flowing through copper tubes in tank 1, as induced by blower T, will evaporate water mixed with an acid, shown in FIGS. 4, 5, and 6. By-pass pipe V is provided so that water vapor in the air will by-pass the air drier E by changing flow with valves K and L. Valves N, M, K, and L are controlled by a switch which permits a current to flow from cells to operate the valves. Also, the valves N, M and the pump R are controlled by the temperature switch. The valves N, M and K are closed when the cells are charged to about 322 volts and the valve L is open until cells lose about two-thirds of its power. The valves K, N, and M are open again; the valve L will close. When the temperature on the temperature switch reaches about 150° C., the switch will close the valves N and M until the temperature drops below 150° C. The tank 15 may be buried in the ground so that the acid will be maintained at a temperature of about 40° to 50° F. The air vent pipe 17 is connected to the vacuum fan 9 suction pipe so that vapor pressure will be reduced in the tank 15 and will continue to evaporate to a desired concentration. The air drier E may be provided in a turbine arrangement.

It will be obvious to those skilled in the art that various changes may be made without departing from the scope of the invention and the invention is not to be considered limited to what is shown in the drawings and described in the specification.

I claim:

1. System for concentrating and recovering acid comprising in combination:
   a. a receptacle or storage tank for receiving and containing weak or dilute acid;
   b. an evaporating pan including a pipe connected to said receptacle or storage tank and a pump whereby acid may be delivered to said evaporating pan;
   c. a second receptacle or storage tank including a pipe connected to said evaporating pan and a pump whereby concentrated acid may be delivered to said second receptacle or storage tank; and
   d. an air drier device in the form of a tank containing acid and including an inlet through which a mixture of air, acid, and water vapor may be introduced, and a pipe connecting said air drier device to said tank for weak or dilute acid and to a pump operable to deliver weak acid to the weak acid tank;

wherein the concentration of the acid of said mixture is increased in said air drier device by separation and removal of some water vapor from the mixture and said evaporating pan includes a heat collecting surface as a floor thereof and a lens focus top whereby heat energy from the sun's rays will heat and concentrate the acid therein by developing water vapor which is removed with air.

2. The system as defined in claim 1, wherein means sensitive to acid concentration of about 92% in combination with a switch are effective to turn on the pump for the pipe connected to said evaporating pan and said second tank to deliver concentrated acid to the latter.

3. The system as defined in claim 2, wherein said pipe connection between said air drier device and said tank for weak or dilute acid includes a pump with an electrically operated valve and means for sensing an acid concentration of about 85% or less in said air drier device to open said electrically operated valve and to operate the pump associated therewith to deliver acid to the tank for weak or dilute acid from said air drier device.

4. The system as defined in any one of claims 1, 2, or 3, wherein one or more tubular passages, having openings to the atmosphere, pass through said receptacle or storage tank for weak or dilute acid in heat exchange relationship with acid therein whereby an auxiliary or preliminary concentration of the acid may be effected.

5. The system as defined in claim 4, wherein a blower device is provided at one end of said tubular passage whereby air from the atmosphere may be drawn through said passages.

6. The system as defined in claim 5, wherein said blower device includes an intake portion with a pipe connected to the evaporating pan to draw exhaust or heated air through said tubular passages.

7. The system as defined in claim 6, wherein said tubular passages include fin structure for enhancing heat exchange with the acid.

* * * * *